United States Patent [19]
Enderlein

[11] Patent Number: 5,255,610
[45] Date of Patent: Oct. 26, 1993

[54] CONVEYOR FOR A SUSPENSION CONVEYOR SYSTEM WITH BEARING ARRANGEMENT FOR VERTICAL AND HORIZONTAL PIVOTING

[75] Inventor: Robby Enderlein, Landsberg/Lech, Fed. Rep. of Germany

[73] Assignee: RSL Logistik GmbH & Co., Landsberg/Lech., Fed. Rep. of Germany

[21] Appl. No.: 892,310

[22] Filed: Jun. 2, 1992

[30] Foreign Application Priority Data

Jun. 3, 1991 [DE] Fed. Rep. of Germany ... 9106797[U]

[51] Int. Cl.⁵ .............................................. B61B 3/00
[52] U.S. Cl. ................................. 105/156; 105/148; 104/49; 213/75 R
[58] Field of Search ........................ 105/148, 150, 156; 107/89, 93; 213/62 R, 74, 75 R

[56] References Cited

U.S. PATENT DOCUMENTS

| | | | |
|---|---|---|---|
| 3,369,501 | 2/1968 | Tsuchimochi | 105/150 |
| 3,528,539 | 9/1970 | Speaker et al. | 105/156 X |
| 3,827,367 | 8/1974 | Paglia | 105/150 |

FOREIGN PATENT DOCUMENTS

| | | | |
|---|---|---|---|
| 0338100 | 4/1988 | European Pat. Off. | |
| 2112378 | 3/1971 | Fed. Rep. of Germany. | |
| 629714 | 5/1982 | Switzerland | 105/148 |
| 698849 | 12/1979 | U.S.S.R. | 105/148 |

Primary Examiner—Robert J. Oberleitner
Assistant Examiner—S. Joseph Morano
Attorney, Agent, or Firm—Finnegan, Henderson, Farabow, Garrett & Dunner

[57] ABSTRACT

A conveyor for a suspension conveyor system comprising a carrier bar suspended from two yokes for receiving objects to be transported. Each of the yokes is suspended from a rail by a pair of rollers and is connected to the carrier bar via at least one joint having an axis of rotation which extends horizontally to the rail and an axis of rotation which extends transverse to the rail. To make the conveyor more universally usable without any negative impact on its conveying properties, the end of the carrier bar is connected to its yoke via a pivot pin extending at right angles to the horizontal axis of rotation, the pivot pin being received in a bearing shell on the end of the bar that permits the carrier bar to be pivoted relative to the pivot pin over a predetermined angular range in a vertical plane about a horizontal axis extending perpendicular to the pivot pin.

16 Claims, 4 Drawing Sheets

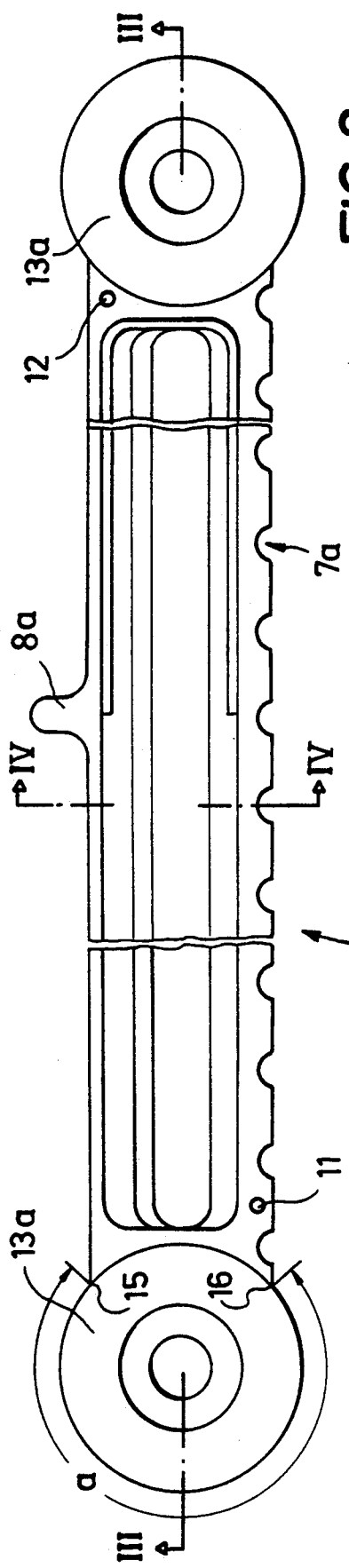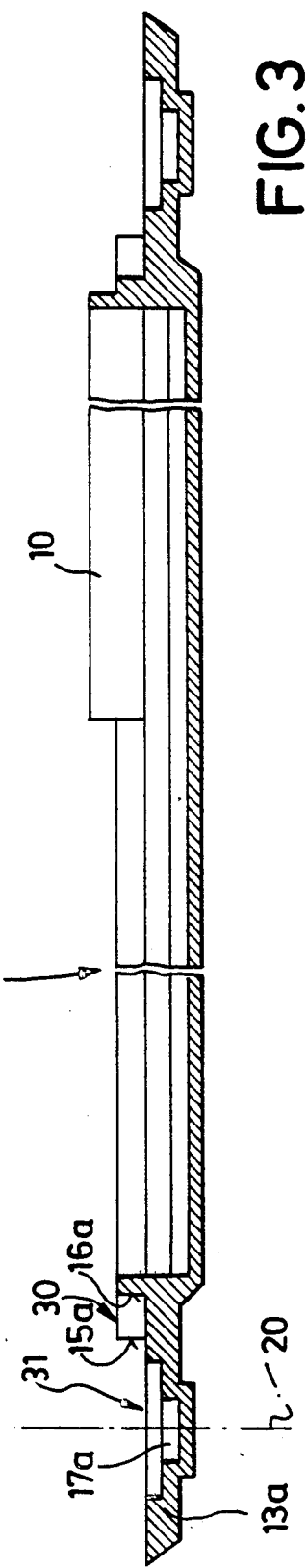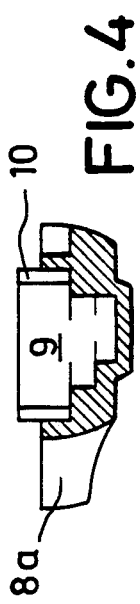

CONVEYOR FOR A SUSPENSION CONVEYOR SYSTEM WITH BEARING ARRANGEMENT FOR VERTICAL AND HORIZONTAL PIVOTING

BACKGROUND OF THE INVENTION

The present invention relates to a conveyor for a suspension conveyor system.

Such a conveyor is known from EP-A-338 100. The conveyor runs along a suspended rail and includes a plurality of trolleys comprising a pair of rollers mounted in a V-shaped yoke that run along an upper surface of the rail and a carrier bar suspended between a pair of the trolleys having a ring projecting upwards and away from the carrier bar in the vicinity of an end face thereof. The yoke also has secured thereto a ring, which extends at right angles to the ring of the carrier bar. The two rings are in engagement with each other and their dimensions are adapted to one another in such a way that the carrier bar can move relative to the yokes. This movement, however, is limited so as not to impair the normal transporting process.

The present invention is based on the task of further developing the conveyor in such a way that the carrier bar can be pivoted relative to the yoke of the trolleys without any negative influence on the system's conveying properties during normal operation.

SUMMARY OF THE INVENTION

This object is achieved in accordance with the present invention by providing a conveyor for a suspension conveyor system comprising two trolleys and a carrier bar, said carrier bar having two ends and being adapted to receive thereon objects to be transported, each of said trolleys comprising a pair of rollers adapted to be suspended from for movement along a suspended rail and a yoke interconnecting said pair of rollers, one of each of said yokes being connected to one end of said carrier bar by a pivot pin, said pivot pin having a first end and a second end, means for connecting said first end of said pivot pin to said yoke and for connecting said second end of said pivot pin to said carrier bar to permit relative rotation of said yoke and said carrier bar with respect to each other about a vertical axis, the means for connecting said second end of said pivot pin to said carrier bar including a bearing shell on the end of the carrier bar having a guide means, said guide means permitting said carrier bar to also pivot relative to the yoke to which that end of the carrier bar is connected about a horizontal axis extending perpendicular to said pivot pin as well as transverse to said rail in a vertical plane over an angular range of at least about 90°.

On the basis of the structural design of the connecting joint of the conveyor of the present invention, which includes a pivot pin, connecting means and a guide means, the carrier bar can, for example, be turned over so that the two sides of the carrier bar can be provided with different means for receiving objects to be transported. Consequently, it is no longer necessary to keep a separate conveyor at hand for each of these objects. Moreover, after removing one of the two yokes from the rail, empty conveyors can be stored in a space-saving manner in a condition in which they are suspended from the rail via the other yoke, since the carrier bars will hang vertically downwards due to the construction of the connecting joint. In spite of these many possibilities of movement, the conveying behavior of the conveyor is not effected.

BRIEF DESCRIPTION OF THE DRAWINGS

An embodiment of the invention is shown in the drawings, in which:

FIG. 2 is a view of the interior of one-half of the carrier bar of the conveyor;

FIG. 3 is a sectional view taken along the line III—III in FIG. 1;

FIG. 4 is a sectional-view taken along the line IV—IV in FIG. 2;;

DETAILED DESCRIPTION OF THE INVENTION

Figure 1:
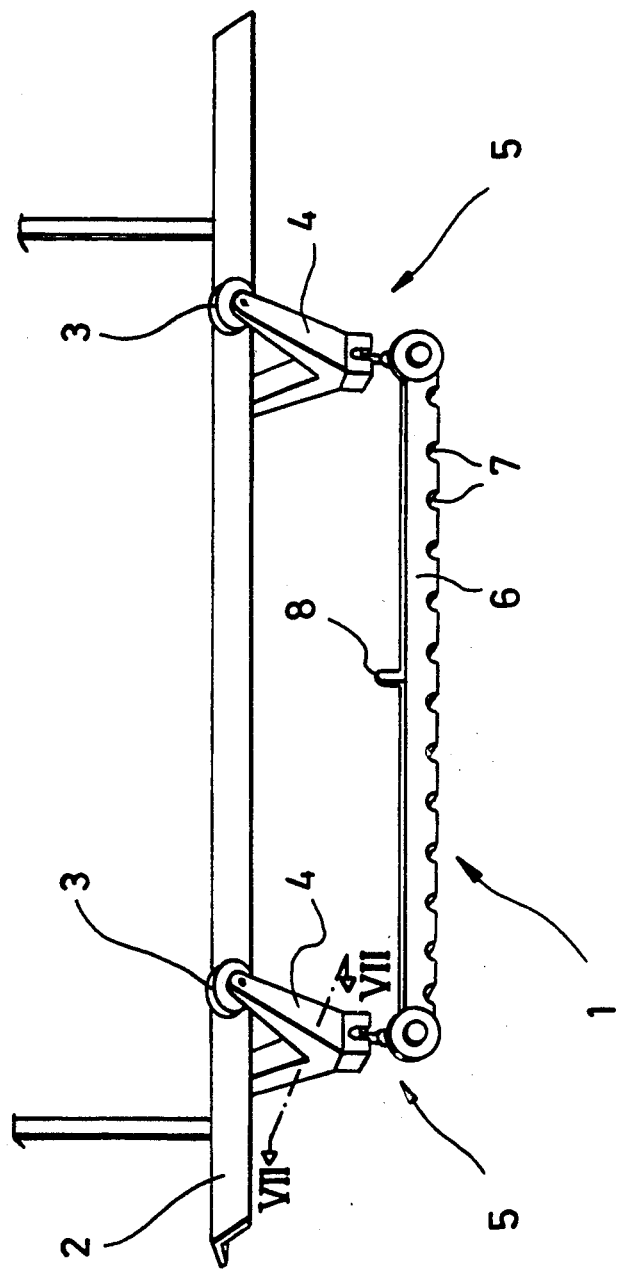
FIG. 1 is a perspective view of the conveyor of the invention suspended from a rail.

FIG. 1 shows, in a schematic, perspective view a conveyor 1 running along a rail 2 only a part of which is shown. Rail 2 has a roof-shaped profile, and rollers 3 roll along on running surfaces of the profile, which are directed upwards at an oblique angle. The rollers 3 are interconnected in pairs by a V- or U-shaped yoke 4 to form trolleys. A pair of trolleys is connected to the two end faces of a carrier bar 6 via a joint 5. In the embodiment shown, the side of the carrier bar facing downwards in FIG. 1 is provided with notches 7 for receiving clothes hanger hooks, and the side of the carrier bar facing upwards in FIG. 1 has provided thereon a separating pin 8.

Carrier bar 6 consists of two carrier bar halves divided along a vertical center line as the bar is shown in FIG. 1. FIGS. 2 to 5 show only one-half 6a of the bar 6. Separation of the bar takes place in a plane that extends vertically during conveyance and the halves are constructed such that one half 8a of separating pin 8 and one-half 7a of the notches 7 are located on either half of the carrier bar. Each of the carrier bar halves has in its interior a cavity 9 (FIG. 4) into which one or several reinforcement bars, which are not shown, can be inserted to increase the torsional rigidity of the bar. A locking web 10 projects out on the surface of each half that engages with the other carrier bar half so as to hold together the two carrier bar halves. Furthermore, a centering pin 11 and a complimentary centering aperture 12 are provided on each carrier bar half for alignment purposes.

Each carrier bar half has one-half 13a and 13b of a bearing shell 13 on either end face thereof that is formed integrally therewith. Each bearing shell half has a first area 30 that extends up to the separating plane and a second area 31 which does not extend up the separating plane through the carrier bar 6. An edge 15a on each bar half defines two stops 15,16 and a stepped surface 16a having the shape of a circular arc is provided between the stops 15,16 in first area 30.

When the two halves 13a,13b are put together to form bearing shell 13, a slot 14 is formed between them, which slot extends over the major part of the circumference of the bearing shell 13. More specifically, it extends over an angular range a (See FIG. 2) in a plane extending vertically during conveyance and ends in stops 15,16 close to carrier bar 6. A stepped, circular hollow space 17a is also formed in each bearing shell half 13a,13b in second area 31 as shown in FIG. 3.

Figure 5:
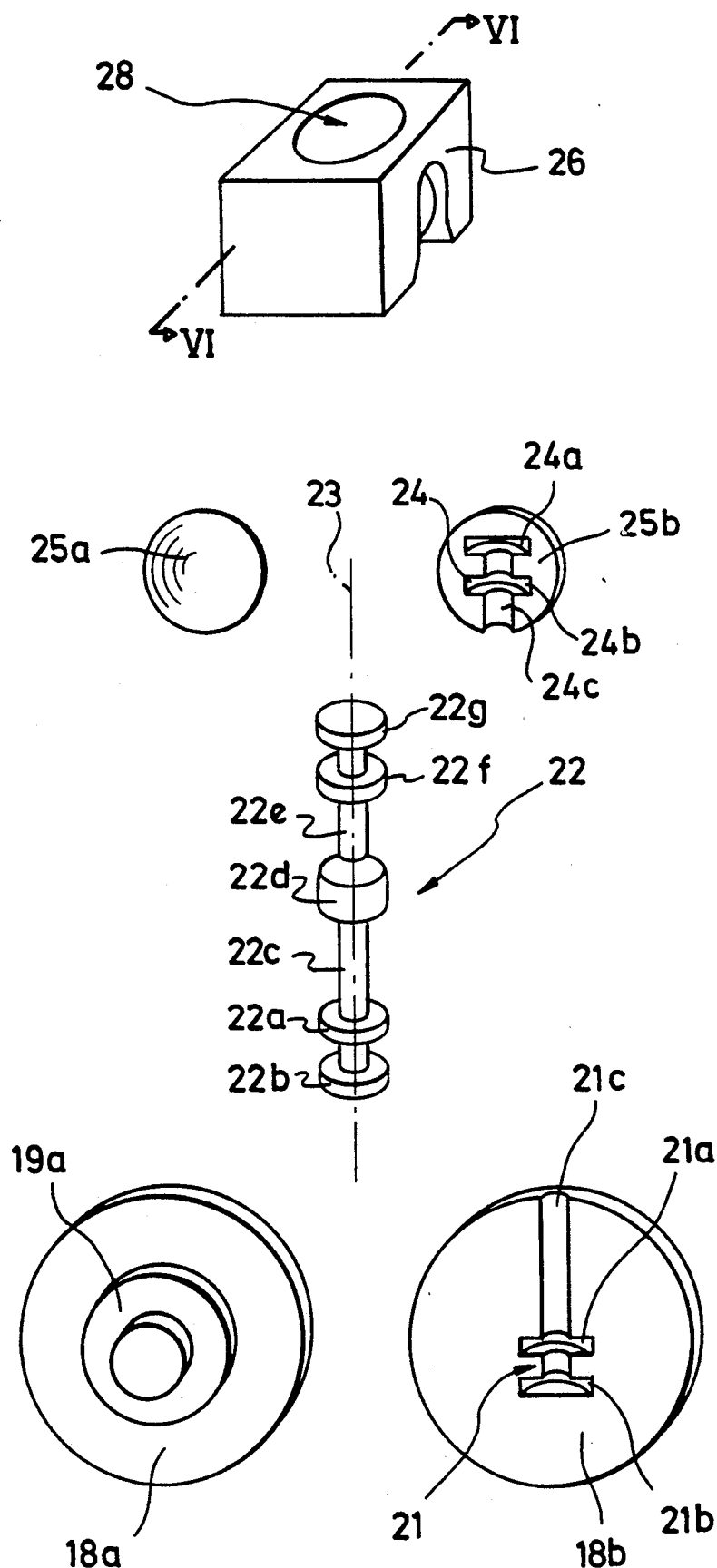
FIG. 5 is an exploded view of the components of the connecting joint between the carrier bar and the yoke of the trolleys of the conveyor.

Hollow space 17a and the free space in slot 14 existing in area 31 up to the vertical separating plane is filled by one of two identical disks 18a,18b, shown in FIG. 5. The diameters of the disks 18a,18b and of the bearing shell halves 13 are adapted to one another such that their peripheral surfaces are in alignment with one another. Each of the disks 18a,18b has on one side thereof stepped, circular trunnions 19a and 19b, which engage the hollow spaces 17a in each bearing shell half. Each of the disks can thus be rotated about a horizontal axis 20 in its respective bearing shell half.

Figure 6:
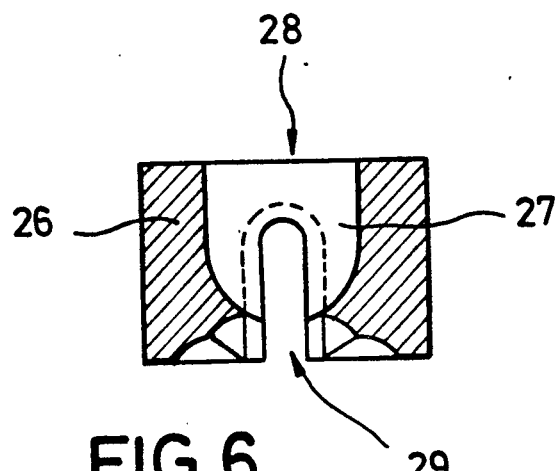
FIG. 6 is a sectional view taken along the line VI—VI of the bearing block of the connecting joint shown in FIG. 5.

On the surfaces of the disks 18a,18b facing one another, a recess 21 is provided for receiving half the circumference of a pivot pin 22. Recess 21 comprises two semicircular recesses 21a and 21b and a slot 21c that opens towards the periphery of the disk. Pivot pin 22 has annular webs 22a and 22b that rest in semicircular recesses 21a,21b of the disks 18a,18b while the slot 21c receives the rod-shaped portion 22c of the pivot pin 22. The lengths of the rod-shaped portion 22c and of the slot 21c are related to one another in such a way that a stop projection 22d on the pin 22 will rest against the other periphery of the disks 18a, 18b when the pivot pin 22 has been inserted into recesses 21 in the two disks. Thus pivot pin 22 will be held between the disks, but it is still able to rotate about its vertical axis 23. Above stop projection 22d, pivot pin 22 has an additional, shorter rod-shaped portion 22e and again two disk projections or annular webs 22f and 22g. These annular webs 22f and 22g and the intermediate rod-shaped portion of the pivot pin 22 between them are received in two identically shaped, corresponding recesses 24 between two ball halves 25a and 23b forming a ball 25. Recesses 24 each have two semicircular recesses 24a and 24b, which are adapted to receive annular webs 22f, 22g, as well as a slot 24c, which open towards the periphery of ball 25. Ball 25 can be inserted into a bearing block 26 connected to the yoke 4 of the trolleys, which block is shown in FIGS. 5 and 6. Bearing block 26 includes a cavity 27, adapted to receive ball 25 with regard to its shape as well as with regard to its diameter, cavity 27 being accessible via an access opening 28 in the top of the block through which ball 25 can be inserted. On the side of bearing block 26 located opposite of access opening 28, there is provided a cross-shaped recess 29, which leads into reception cavity 27. The lengths of the slot arms of the cross-shaped recess 29 are determined by the required freedom of movement of pivot pin 22. The edges of the recess are rounded for the stop projection 22d.

Figure 7:
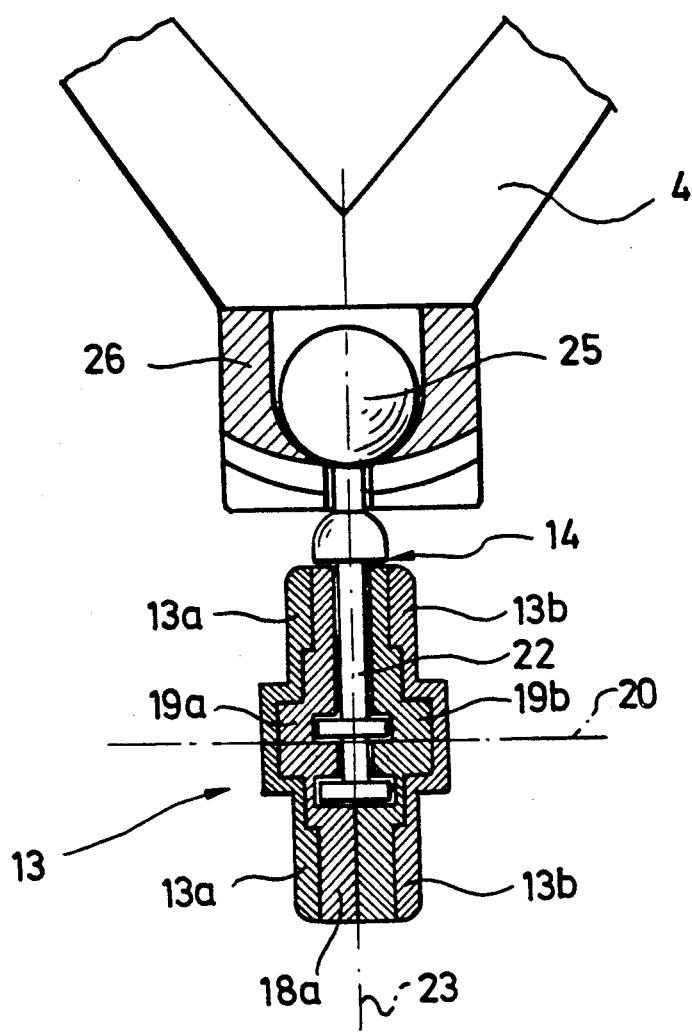
FIG. 7 is a sectional view taken along the line VII—VII of FIG. 1.

To mount carrier bar 6 to the yokes 4, the top or first end of pivot pin 22 is first placed between the ball halves 25a,25b, the ball halves are closed forming ball 25 and the pivot pin 22 plus the ball 25 are then inserted into bearing block 26 from above through the opening 28. Following this, disks 18a,18b are placed around the lower or second end of the pivot pin, and they are then placed in the bearing shell halves 13a,13b of the carrier bar 6. When the carrier bar halves have been locked together by webs 10, bearing block 26 is secured to the yokes 4 via its surface containing access opening 28, as shown in FIG. 7.

In the assembled condition, carrier bar 6 can thus be pivoted relative to a trolley yoke 4 about a horizontal axis 20 throughout the whole angular range a, the pivotal movement only being stopped by pivot pin 22 engaging the stops 15 and 16 at opposite ends of the pivotal movement. The stops 15,16 are located such that, when the carrier bar travels along an inclined path, the pivot pin will be able to move slightly towards the upper side of the carrier bar in the ascent or descent. For the purpose of cornering, carrier bar 6 and pivot pin 22 can also rotate relative to yoke 4 about vertical axis 23.

If carrier bar 6 is to be pivoted from its position shown in FIG. 1 to a position in which the notches 7 for receiving therein the clothes hangers are to face upwards, one of the yokes 4 is removed from rail 2, and the carrier bar 6 pivoted downwards about horizontal axis 20 through approximately 90°. Thereafter, it is rotated about vertical axis 23 until the notches face upwards. Following this, yoke 4 is reattached to the rail. For storing the conveyor means 1, only one of the yokes 4 is removed from the rail. Due to the structural design of the joint according to the present invention, the conveyor will, under the influence of the force of gravity, assume a position where all of the parts will thus hang vertically downwards and consequently, will take up as little space as possible.

The described parts of the connecting joint, with the exception of the pivot pin, and the carrier bar, with the exception of the reinforcement bar, advantageously from an economic standpoint, can be produced from suitable plastic material.

Structural modifications can be made to the connecting joint shown without departing from the spirit of the invention. Furthermore, the carrier bar can be provided with other reception means, e.g. clips. Finally, instead of using plastic material for producing the conveyor means, other materials may be used.

I claim:

1. A conveyor for a suspension conveyor system comprising two trolleys and a carrier bar, said carrier bar having two ends and being adapted to receive thereon objects to be transported, each of said trolleys comprising a pair of rollers adapted to be suspended from for movement along a suspended rail and a yoke interconnecting said pair of rollers, one of each of said yokes being connected to one end of said carrier bar by a pivot pin, said pivot pin having a first end and a second end, means for connecting said first end of said pivot pin to said yoke and for connecting said second end of said pivot pin to said carrier bar to permit relative rotation of said yoke and said carrier bar with respect to each other about a vertical axis, the means for connecting said second end of said pivot pin to said carrier bar including a bearing shell on the end of the carrier bar having a guide means, said guide means permitting said carrier bar to also pivot relative to said yoke to which that end of the carrier bar is connected about a horizontal axis extending perpendicular to said pivot pin as well as transverse to said rail in a vertical plane over an angular range of at least about 90°.

2. The conveyor of claim 1, wherein said guide means is a slot in said bearing shell extending over said predetermined angular range.

3. The conveyor of claim 1, wherein a rotatable member is received in the bearing shell that rotates about the horizontal axis relative to said carrier bar, the second end of said pivot pin being secured in said rotatable member.

4. The conveyor of claim 3, wherein the rotatable member comprises two disks having recesses in opposing surfaces thereof for receiving therein one half of the second end of said pivot pin.

5. The conveyor of claim 1, wherein the means for connecting said first end of the pivot pin to said yoke also permits relative rotation of said carrier bar and said yoke with respect to each other about at least one further horizontal axis.

6. The conveyor of claim 5, wherein said means for connecting the first end of the pivot pin to the yoke includes a rotatable member which is connected to said first end of the pivot pin and which is held in a bearing cavity in the yoke.

7. The conveyor of claim 6, wherein the rotatable member is a ball.

8. The conveyor of claim 7, wherein the ball comprises two half spheres each having a recess for receiving therein one-half of the first end of the pivot pin.

9. The conveyor of claim 6, wherein the bearing cavity is located in a bearing block having an opening that permits the pivot pin to be pivoted about said further horizontal axis.

10. The conveyor of claim 9, wherein the opening is a cross-shaped slot allowing the pin to be pivoted about two of said further horizontal axes extending perpendicular to each other.

11. The conveyor of claim 1, wherein the carrier bar has a cavity for selectively receiving therein a reinforcement member.

12. The conveyor of claim 11, wherein the carrier bar comprises two halves which are releasably interconnected.

13. The conveyor of claim 12, wherein the plane of separation of the carrier bar halves extends vertically through the center of the bar.

14. The conveyor of claim 12, wherein each half of the carrier bar has integrally connected at each end, one half of said bearing shell which together form said bearing shell when said two carrier bar halves are interconnected.

15. The conveyor of claim 1, wherein one horizontal side of the carrier bar has provided thereon notches for attaching thereto objects suspended from hooks.

16. A conveyor for a suspension conveyor system comprising two trolleys and a carrier bar, said carrier bar having two ends and being adapted to receive thereon objects to be transported, each of said trolleys comprising a pair of rollers adapted to be suspended from for movement along a suspended rail and a yoke interconnecting said pair of rollers, one of each of said yokes being connected to one end of said carrier bar by a pivot pin, said pivot pin having a first end and a second end, means for connecting said first end of said pivot pin to said yoke and for connecting said second end of said pivot pin to said carrier bar to permit relative rotation of said yoke and said carrier bar with respect to each other about a vertical axis, the means for connecting said second end of said pivot pin to said carrier bar including a bearing shell on the end of the carrier bar having a guide means, said guide means permitting said carrier bar to be pivoted with respect to said trolley about a horizontal axis extending perpendicular to said pivot pin as well as transverse to said rail, said carrier bar being comprised of two halves separable along a plane extending vertically through the center of the carrier bar, said halves being releasably interconnected and including therein a reception cavity for selectively receiving a reinforcement member.

* * * * *